United States Patent [19]

Kasori et al.

[11] 4,418,985

[45] Dec. 6, 1983

[54] MULTI-COMPONENT GLASS OPTICAL FIBER FOR OPTICAL COMMUNICATION

[75] Inventors: Mituo Kasori, Kawasaki; Takeshi Takano, Samukawa; Hironori Maki, Kawasaki; Naohiko Ogino, Yokohama, all of Japan

[73] Assignee: Tokyo Shibaura Denki Kabushiki Kaisha, Kawasaki, Japan

[21] Appl. No.: 382,286

[22] Filed: May 26, 1982

[30] Foreign Application Priority Data

May 30, 1981 [JP]  Japan .................. 56-83498

[51] Int. Cl.$^3$ ............... C03C 3/08; C03C 13/00; G02B 5/14
[52] U.S. Cl. .................. 350/96.34; 501/37; 501/38; 501/66; 501/67; 501/77; 501/903
[58] Field of Search ............ 501/37, 38, 66, 67, 501/77, 903; 350/96.34

[56] References Cited

U.S. PATENT DOCUMENTS

| | | | |
|---|---|---|---|
| 3,841,882 | 10/1974 | Wolf | 350/96.34 |
| 4,264,131 | 4/1981 | Sawamura et al. | 501/37 X |
| 4,265,667 | 5/1981 | Ikeda et al. | 350/96.34 |
| 4,275,951 | 6/1981 | Beales et al. | 501/37 X |
| 4,367,012 | 1/1983 | Ikeda et al. | 350/96.34 |

FOREIGN PATENT DOCUMENTS

| | | |
|---|---|---|
| 55-20214 | 2/1980 | Japan . |
| 55-60040 | 5/1980 | Japan . |
| 56-22654 | 3/1981 | Japan . |
| 1301409 | 12/1972 | United Kingdom . |

OTHER PUBLICATIONS

European Search Report.

Primary Examiner—Helen M. McCarthy
Attorney, Agent, or Firm—Schwartz, Jeffery, Schwaab, Mack, Blumenthal & Koch

[57] ABSTRACT

There is provided a multi-component system glass fiber for optical communication which comprises a multi-component system glass for core having a composition comprising $SiO_2$, BaO, $Al_2O_3$, $B_2O_3$, at least one alkali metal oxide selected from $Na_2O$, $K_2O$ and $Li_2O$, MgO and CaO in amounts as specified in the specification and claims, and a multi-component system glass for clad layer having a composition comprising $SiO_2$, $Al_2O_3$, $B_2O_3$, $Na_2O$, $K_2O$, $Li_2O$, at least one alkaline earth metal selected from MgO and CaO in amounts as specified in the specification and claims. The core in the glass fiber for optical communication according to the present invention shows lower optical loss and the clad layer shows high weathering resistance, and the glass fiber according to the present invention suffers from no devitrification during fiber drawing and is excellent in dimensional stability.

6 Claims, 4 Drawing Figures

MULTI-COMPONENT GLASS OPTICAL FIBER FOR OPTICAL COMMUNICATION

BACKGROUND OF THE INVENTION

This invention relates to a glass fiber for optical communication, more particularly, to an improved glass composition for a glass fiber with a large numerical aperture, which can effectively be used for optical communication.

Generally speaking, a glass fiber for optical communication is constituted of a core and a clad layer which is provided around the core and has a smaller refractive index than said core. It transmits an optical information permitted to enter from one end of said fiber to the other end of said fiber by confining the information within said core by utilization of the total reflection at the interface between said core and said clad layer. In the prior art, there have been applied as a glass for such fibers glasses principally composed of quartz (see Japanese Provisional Patent Publication Nos. 60040/1980, 20214/1981, and 222654/1981) and optical glasses in general.

However, in case of the former, there are involved the following drawbacks: p0 (1) Due to the composition predominantly of a single component optically admixed with minute amounts of additives, the refractive index of the central component of quartz is fixed as a physical property value and therefore cannot afford a high refractive index in compliance with the requirement;

(2) In preparation of a fiber by fiber drawing from a rod-shaped mother material glass with a diameter of about 10 mm, if the characteristics of the glass for the core and the glass for the clad layer are greatly changed, that is, the numerical aperture is attempted to be enhanced by giving a greater refractive index difference between both glasses, there will be generated cracks in the mother material due to the difference in thermal expansion coefficient between both glasses resulting in a failure of fiber drawing and giving only limited range of feasible characteristics.

On the other hand, optical glasses have the following drawbacks:

(1') In preparation of an optical glass, there are added considerable amounts of alkali metals or alkaline earth metals to the principal components such as quartz or boric acid, whereby the weathering resistance of the resultant glass is lowered to give characteristics which are not sufficiently reliable under practical conditions;

(2') It is very difficult to remove light absorptive impurities contained in various kinds of starting materials as well as those entrained during the preparation steps, and consequently the resultant fiber is increased in optical loss so as to be not practically useful.

SUMMARY OF THE INVENTION

An object of the present invention is to provide a multi-component system glass fiber which can be effectively used in optical communication.

A further object of the present invention is to provide a multi-component system glass fiber comprising a multi-component system glass for a core with low loss.

Another object of the present invention is to provide a multi-component system glass fiber coated with a multi-component system glass for a clad layer having generally high weathering resistance, including water resistance, acid resistance, alkali resistance, etc.

Still another object of the present invention is to provide a multi-component system glass fiber which suffers from no devitrification during fiber drawing and is excellent in dimensional stability.

The multi-component system glass fiber of the present invention satisfies the objects as enumerated above. It is also improved in reliability because the difference in thermal expansion coefficient ($\alpha$) between the multi-component system glass for the core and the multi-component system glass for the clad layer is as small as $3 \times 10^{-6}$ (cm/cm.°C.; 0°–300° C.) to make the stress therebetween in the glass fiber very small. Further, there is an additional effect of increased specific refractive index difference ratio $\Delta n : (n_1 - n_2)/n_1$ of 0.03 or more, wherein $n_1$ is the refractive index of a core and $n_2$ the refractive index of a clad layer.

The multi-component system glass fiber for optical communication according to the present invention comprises:

a multi-component system glass for the core having a composition comprising 35 to 45% by weight of $SiO_2$, 35 to 45% by weight of BaO, 3 to 6% by weight of $Al_2O_3$, 9 to 13% by weight of $B_2O_3$, 2 to 6% by weight of at least one alkali metal oxide selected from the group consisting of $Na_2O$, $K_2O$ and $Li_2O$, the content of $Na_2O$ being 2.5% by weight or less, and 4 to 11% by weight of at least one alkaline earth metal oxide selected from the group consisting of MgO and CaO; and A multi-component system glass for the clad layer having a composition comprising 66 to 71% by weight of $SiO_2$, 4 to 7% by weight of $Al_2O_3$, 7 to 12% by weight of $B_2O_3$, 12 to 16% by weight of at least one alkali metal oxide selected from the group consisting of $Na_2O$, $K_2O$ and $Li_2O$, 2% by weight or less of at least one alkaline earth metal oxide selected from the group consisting of MgO and CaO, and 3% by weight or less of at one of ZnO, $ZrO_2$ and $TiO_2$.

DETAILED DESCRIPTION OF PREFERRED EMBODIMENTS

In the multi-component system glass for the core according to the present invention, $SiO_2$ is a component constituting the skeleton of the glass is and set at 35 to 45% by weight, preferably 36 to 41% by weight. If the content is less than 35% by weight, water resistance of the glass is lowered and there is also generated devitrification. On the other hand, when the content exceeds 45% by weight, no desired refractive index can be obtained as the result of the relationship with other components.

In the present invention, BaO is set at 35 to 45% by weight, preferably 36 to 41% by weight. BaO is an essential component for making a glass with high refractive index, and a high refractive index glass containing BaO as the component for increasing refractive index is better suited for a fiber for optical communication, since it is smaller in light scattering, than high refractive index glasses containing PbO or $Bi_2O_3$ as the components for increasing refractive index. With a BaO content less than 35% by weight, no glass with a desired refractive index can be obtained, while an amount in excess of 45% by weight will cause generation of devitrification and lower water resistance of the glass.

$Al_2O_3$ is a component contributing to devitrification inhibition and improvement of water resistance of the glass and is set at 3 to 7% by weight, preferably 3.5 to 5% by weight. At a level of $Al_2O_3$ lower than 3% by weight, no improvement of water resistance can be recognized and the glass is susceptible of devitrification. On the other hand, when the content exceeds 6% by weight, improvement of water resistance is saturated and $Al_2O_3$ will contrariwise be crystallized out in a manner different from the case of less than 3% by weight to make the glass prone to devitrification.

$B_2O_3$ is a component contributing to improvement of ready solubility and devitrification of the glass and is set at 9 to 13% by weight, preferably 10 to 12% by weight. At a level of $B_2O_3$ lower than 9% by weight, it is difficult to melt the glass at a temperature at which contamination from the melting environment is negligible and the glass is susceptible of devitrification. On the other hand, when the content exceeds 13% by weight, water resistance of the glass is lowered to give a glass which cannot practically be provided for use.

Any of alkali metal oxides such as $Na_2O$, $Li_2O$ and $K_2O$ acts as a network modifying oxide. These oxides may be incorporated as desired either as a single species or a combination of two or more species, but it is required that $Na_2O$ should be 2.5% by weight or less, preferably 1.5% by weight or less, and the total content is set within the range of 1.2 to 6% by weight, preferably 1.2 to 4% by weight. When $Na_2O$ is contained in excess of 2.5% by weight, there may be caused such inconveniences as the increase in melting temperature. When the total content is less than 1.2% by weight, the melting temperature of the glass is high and there may also be caused such a phenomenon that some of the oxides remain unmelted, whereby homogeneity of the glass is lowered. On the other hand, at a level over 6% by weight, the glass is lowered in water resistance and is prone to devitrification. The proportional ratio between $Na_2O$, $Li_2O$ and $K_2O$ has influences on the properties of the glass, and it is preferred that $Na_2O$ may be 0 to 2.5% by weight with the remainder being constituted of $K_2O$ and $Li_2O$.

Each of CaO and MgO is a component contributing to improvement of weathering resistance, and the total quantity thereof is set at 4 to 11% by weight, preferably 4.5 to 7% by weight. When it is less than 4% by weight, the resultant glass is low in weathering resistance, while devitrification will be caused when it exceeds 11% by weight. The proportional ratio between CaO and MgO has influences on the properties of the glass, and it is preferred that CaO may be 3 to 7% by weight, and MgO 2 to 4% by weight. Other components such as SrO, ZnO and $ZrO_2$ are also found to have an effect similar to CaO or MgO, and these components may be added in an amount of 4% by weight or less in the present invention.

Next, in the multi-component system glass for clad layer according to the present invention, $SiO_2$ is a component constituting the skeleton of the glass and is set at 66 to 71% by weight, preferably 67 to 70% by weight. If the content is less than 66% by weight, water resistance of the glass is lowered. On the other hand, when the content exceeds 71% by weight, viscosity at a higher temperature is increased to invite undesirable increase in viscosity difference from the core glass at the time of fiber drawing.

$Al_2O_3$ is a component contributing to improvement of water resistance of the glass and is set at 4 to 7% by weight, preferably 5.5 to 7% by weight. At a level of $Al_2O_3$ lower than 4% by weight, no desired effect can be achieved, while the glass is susceptible of devitrification when the content exceeds 7% by weight.

$B_2O_3$ is a component contributing to improvement of devitrification and increase of refractive index of the glass and is set at 7 to 12% by weight, preferably 7.5 to 10% by weight. At a level of $B_2O_3$ exceeding 12% by weight, the refractive index of the clad layer glass is increased too high to give a desired refractive index difference. On the other hand, when the content is less than 7% by weight, devitrification will be caused.

Any of alkali metal oxides such as $Na_2O$, $Li_2O$ and $K_2O$ acts as a network modifying oxide. The total content of these components is set within the range of 12 to 16% by weight, preferably 13.5 to 16% by weight. When the total content is less than 12% by weight, the glass is prone to devitrification, while, at a content over 16% by weight, water resistance of the glass is lowered and no clad layer satisfies the desired requirements. The proportional ratio of these components has influences on the properties of the glass, and it is preferred that $Na_2O$ may be 6 to 8% by weight, $K_2O$ 3.5 to 6% by weight and $Li_2O$ 2 to 4% by weight.

Each of CaO and MgO is a component contributing to improvement of weathering resistance and increase of refractive index, and they may be contained either alone or in combination. The total quantity of these components in either case is set at 2% by weight or less, preferably 1% by weight or less. When it is over 2% by weight, the refractive index of the clad layer glass becomes too high to give a desired refractive index difference between the clad layer and the core.

ZnO is a component contributing to improvement of water resistance of the glass and increase of refractive index of the glass and is set at 3% by weight or less, preferably 2.5% by weight or less. A content over 3% by weight is not suitable, because the refractive index of the clad layer glass is increased too high to give a desired refractive index difference between the clad layer and the core. Other components such as $ZrO_2$ and $TiO_2$ are also found to have an effect similar to ZnO and may be added as the components. However, the total amount of ZnO, $ZrO_2$ and $TiO_2$ is within the range of from 0 to 3% by weight. The glass fiber of the present invention may be prepared according to the following process:

After various materials, which have been highly purified for glass fiber, are formulated and dried at around 500° C. for several ten hours, the resultant mixture is introduced into a crucible and melted in an electric furnace to be vitrified. The formulating and melting operations should be conducted in a clean room or in a clean bench to prevent the contamination with impurities from the environment. Further, during the melting operation, a dried gas may be bubbled into the melted glass to promote the stirring thereof and to accelerate the dehydration thereof. The thus obtained glasses for use as a core and a clad layer are separately charged into separate chambers of a crucible having coaxially oriented orifices and are drawn into a fiber by making the melted glasses flow down from the respective orifices.

The present invention may be better understood with reference to the following Examples, which are set forth for illustration of the characteristics of the glass fiber of the present invention and the process for preparation thereof.

A. CHARACTERISTICS OF GLASSES WITH DIFFERENT COMPOSITIONS

Experimental example 1: Glasses with different contents of BaO and $Al_2O_3$

Glasses having the compositions as shown in Table 1 (Samples 1-8) were prepared by melting with the use of platinum crucibles in an electric furnace and the characteristics of respective samples were examined.

water bath, and the change in weight after heating was examined and shown in terms of the weight loss (%). The relationship between the water resistance and the $Al_2O_3$ content was shown in FIG. 1.

(2) Weathering resistance: Haze formed on the glass surface was observed and evaluated according to the following ranks:

| | |
|---|---|
| More difficult in formation of haze than SK-16 | a |
| Similar to SK-16 | ab |
| Easier in formation of haze than SK-16 | b |

Figure 1:
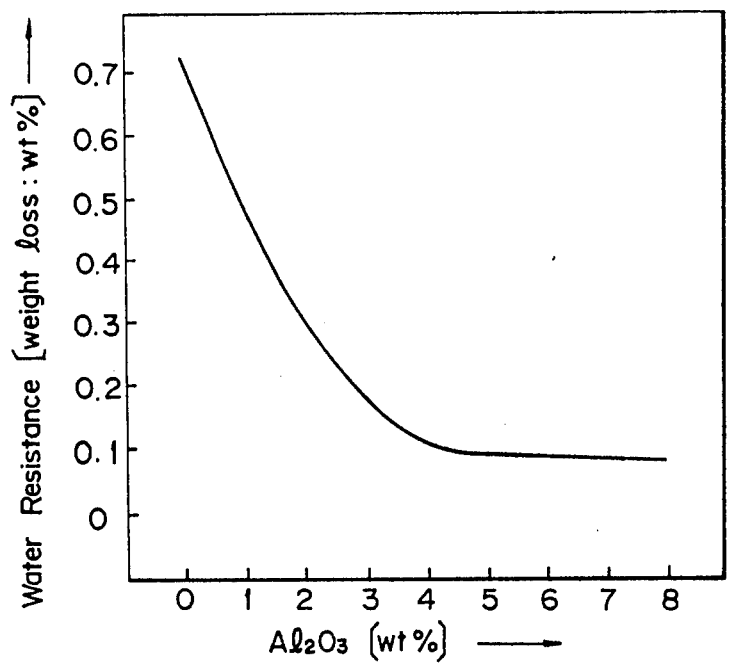
FIG. 1 is a graph showing the relationship between $Al_2O_3$ content and water resistance in the glass composition according to the present invention in Experimental example 1.
Figure 2:
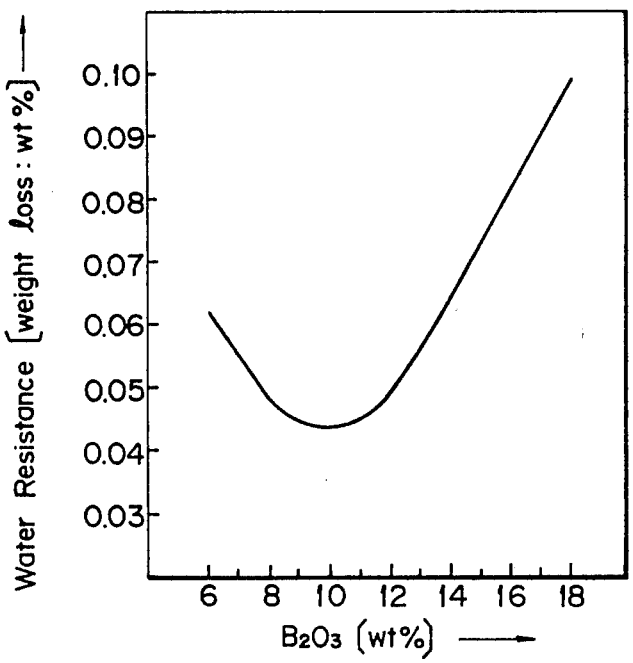
FIG. 2 is a graph showing the relationship between $B_2O_3$ content and water resistance in the glass composition according to the present invention in Experimental example 8.

As seen from Table 1, water resistance and weathering resistance were improved by addition of $Al_2O_3$. However, as shown in FIG. 1, water resistance could be improved only to a small extent when the $Al_2O_3$ content is 3% by weight or less, and the glass tended to be devitrified at a level of 7% by weight or higher. The softening temperature Ts was at its minimum at around 4 by weight of $Al_2O_3$, and higher at levels lower or higher than said content. As to devitrification, it can be

TABLE 1

| Composition (wt. %) | | Sample No. | | | | | | | |
|---|---|---|---|---|---|---|---|---|---|
| | | 1 | 2 | 3 | 4 | 5 | 6 | 7 | 8 |
| $SiO_2$ | | 38.18 | 38.18 | 38.18 | 38.18 | 38.18 | 38.18 | 38.18 | 38.18 |
| $B_2O_3$ | | 11.15 | 11.15 | 11.15 | 11.15 | 11.15 | 11.15 | 11.15 | 11.15 |
| $Al_2O_3$ | | 0 | 1.0 | 3.0 | 4.0 | 5.0 | 6.0 | 7.0 | 8.0 |
| $Na_2O$ | | 1.23 | 1.23 | 1.23 | 1.23 | 1.23 | 1.23 | 1.23 | 1.23 |
| MgO | | 2.27 | 2.27 | 2.27 | 2.27 | 2.27 | 2.27 | 2.27 | 2.27 |
| CaO | | 3.55 | 3.55 | 3.55 | 3.55 | 3.55 | 3.55 | 3.55 | 3.55 |
| BaO | | 43.62 | 42.62 | 40.62 | 39.62 | 38.62 | 37.62 | 36.62 | 35.62 |
| Refractive index | $n_D$ | 1.6094 | 1.6061 | 1.5996 | 1.5970 | 1.5935 | 1.5910 | 1.5880 | 1.5855 |
| Thermal expansion coefficient | $\alpha$ ($\times 10^{-7}$/°C.) | 84 | 83 | 81 | 80 | 79 | 77 | 76 | 76 |
| Softening temperature | Ts (°C.) | 734 | 732 | 730 | 728 | 732 | 734 | 737 | 740 |
| Water resistance (weight loss) | Weight % | 0.697 | 0.480 | 0.182 | 0.105 | 0.099 | 0.097 | 0.095 | 0.090 |
| Devitrification | 850° C. | C | C | C | C | C | C | C | C |
| | 900° C. | C | C | C | A | A | A | C | C |
| | 950° C. | C | C | A | A | A | A | A | C |
| Weathering resistance | | ab | ab | a | a | a | a | a | a |

For each of the glasses, there were examined refractive index $n_D$, thermal expansion coefficient: $\alpha \times 10^{-7}$/°C. at 100° to 300° C., softening temperature Ts: °C. and the degree of devitrification when heat treated at the estimated fiber drawing temperature of 850°-950° C. for 5 hours. In the Table, the letters under devitrification mean the following:

A: No devitrification
B: Change of properties on the surface
C: Devitrified on the surface
D: Devitrified throughout the bulk Water resistance and weathering resistance were determined according to the following methods:

(1) Water resistance: 5.0 g of sample powders passing through the JIS standard screen with mesh opening of 0.5 mm and not passing through a similar screen with mesh opening of 0.3 mm were immersed in 100 ml of distilled water, heated for one hour in a boiling seen that devitrification is least likely to occur in the range of $Al_2O_3$ content of 3 to 7% by weight.

Experimental Example 2: Glasses having $SiO_2$ replaced with $Al_2O_3$

Glasses having the compositions as shown in Table 2 (Samples 9-15) were prepared by melting with the use of platinum crucibles in an electric furnace and the characteristics of respective samples were examined.

The methods for evaluation of various characteristics as well as the representation methods were the same as in the foregoing Experimental examples. As seen from Table 2, $Al_2O_3$ has the effect of improving water resistance and suppressing devitrification at 3 to 7% by weight. As different from Experimental example 1, the softening temperature Ts was increased with increase of $Al_2O_3$ content, but the thermal expansion coefficient $\alpha$ remained substantially unchanged.

TABLE 2

| Composition (wt. %) | Sample No. | | | | | | |
|---|---|---|---|---|---|---|---|
| | 9 | 10 | 11 | 12 | 13 | 14 | 15 |
| $SiO_2$ | 39.60 | 38.60 | 37.60 | 36.60 | 35.60 | 34.60 | 33.60 |

TABLE 2-continued

| Composition (wt. %) | | 9 | 10 | 11 | 12 | 13 | 14 | 15 |
|---|---|---|---|---|---|---|---|---|
| | $B_2O_3$ | 11.15 | 11.15 | 11.15 | 11.15 | 11.15 | 11.15 | 11.15 |
| | $Al_2O_3$ | 2.0 | 3.0 | 4.0 | 5.0 | 6.0 | 7.0 | 8.0 |
| | $Na_2O$ | 1.23 | 1.23 | 1.23 | 1.23 | 1.23 | 1.23 | 1.23 |
| | $K_2O$ | 1.87 | 1.87 | 1.87 | 1.87 | 1.87 | 1.87 | 1.87 |
| | MgO | 2.27 | 2.27 | 2.27 | 2.27 | 2.27 | 2.27 | 2.27 |
| | CaO | 3.55 | 3.55 | 3.55 | 3.55 | 3.55 | 3.55 | 3.55 |
| | BaO | 38.33 | 38.33 | 38.33 | 38.33 | 38.33 | 38.33 | 38.33 |
| Refractive index | $n_D$ | 1.5895 | 1.5913 | 1.5922 | 1.5930 | 1.5934 | 1.5938 | 1.5939 |
| Thermal expansion coefficient | $\alpha$ ($\times 10^{-7}$/°C.) | 84 | 83 | 83 | 83 | 83 | 83 | 83 |
| Softening temperature | Ts (°C.) | 732 | 736 | 739 | 741 | 743 | 745 | 746 |
| Water resistance (weight loss) | Wt. % | 0.162 | 0.138 | 0.119 | 0.112 | 0.103 | 0.082 | 0.064 |
| Devitrification | 850° C. | C | C | C | C | C | C | C |
| | 900° C. | C | C | C | C | C | C | C |
| | 950° C. | C | A | A | A | A | A | C |
| Weathering resistance | | a | a | a | a | a | a | a |

Experimental example 3: Glasses having $SiO_2$ replaced with $B_2O_3$

Glasses having the compositions as shown in Table 2 (Samples 16-21) were prepared similarly as in Experimental example 1 and the characteristics of respective samples were examined.

The methods for evaluation of various characteristics as well as the representation methods were the same as in Experimental example 1. As seen from Table 3, $B_2O_3$ has the effects of suppressing devitrification, increasing refractive index $n_D$ and lowering softening temperature Ts, but on the other hand worsens water resistance and weathering resistance. The effect of suppressing devitrification cannot be expected at a level of $B_2O_3$ less than 6% by weight, while addition thereof in an amount exceeding 15% by weight is not expedient from the aspect of water resistance.

Experimental example 4: Glasses having BaO replaced with $B_2O_3$

Glasses having the compositions as shown in Table 4 (Samples 22-27) were prepared similarly as in Experimental example 1 and the characteristics of respective samples were examined.

The methods for evaluation of various characteristics as well as the representation methods are the same as in the foregoing Experimental examples. As seen from Table 4, $B_2O_3$ lowers water resistance and weathering resistance. The effect of $B_2O_3$ is different from the case of Experimental example 3 in that there is small change in softening temperature Ts and refractive index $n_D$. With regard to the Sample glass 27, homogeneous melting of the same was so difficult that no glass can be provided for evaluation. The Sample glasses 22-27 shown in Table 4 have very poor water resistance and devitrification tendency, because they contain no $Al_2O_3$.

TABLE 3

| Composition (wt. %) | | 16 | 17 | 18 | 19 | 20 | 21 |
|---|---|---|---|---|---|---|---|
| | $SiO_2$ | 43.28 | 41.28 | 38.28 | 34.28 | 31.28 | 27.28 |
| | $B_2O_3$ | 6.0 | 8.0 | 11.0 | 15.0 | 18.0 | 22.0 |
| | $Al_2O_3$ | 4.0 | 4.0 | 4.0 | 4.0 | 4.0 | 4.0 |
| | $Na_2O$ | 1.23 | 1.23 | 1.23 | 1.23 | 1.23 | 1.23 |
| | $K_2O$ | 1.87 | 1.87 | 1.87 | 1.87 | 1.87 | 1.87 |
| | MgO | 2.27 | 2.27 | 2.27 | 2.27 | 2.27 | 2.27 |
| | CaO | 3.55 | 3.55 | 3.55 | 3.55 | 3.55 | 3.55 |
| | BaO | 37.80 | 37.80 | 37.80 | 37.80 | 37.80 | 37.80 |
| Refractive index | $n_D$ | 1.5875 | 1.5895 | 1.5924 | 1.5939 | 1.5962 | 1.5971 |
| Thermal expansion coefficient | $\alpha$ ($\times 10^{-7}$/°C.) | 87 | 86 | 84 | 83 | 83 | 82 |
| Softening temperature | Ts (°C.) | 752 | 746 | 735 | 721 | 710 | 699 |
| Water resistance (weight loss) | Weight % | 0.063 | 0.086 | 0.165 | 0.242 | 0.239 | 0.382 |
| Devitrification | 850° C. | C | C | C | A | A | A |
| | 900° C. | C | C | A | A | A | A |
| | 950° C. | C | A | A | A | A | A |
| Weathering resistance | | a | a | a | a | ab | ab |

TABLE 4

| Composition (wt. %) | | Sample No. | | | | | |
| --- | --- | --- | --- | --- | --- | --- | --- |
| | | 22 | 23 | 24 | 25 | 26 | 27 |
| | SiO$_2$ | 38.18 | 38.18 | 38.18 | 38.18 | 38.18 | 38.18 |
| | B$_2$O$_3$ | 8.0 | 9.0 | 10.0 | 12.0 | 15.0 | 20.0 |
| | Al$_2$O$_3$ | — | — | — | — | — | — |
| | Na$_2$O | 1.23 | 1.23 | 1.23 | 1.23 | 1.23 | 1.23 |
| | K$_2$O | — | — | — | — | — | — |
| | MgO | 2.27 | 2.27 | 2.27 | 2.27 | 2.27 | 2.27 |
| | CaO | 3.55 | 3.55 | 3.55 | 3.55 | 3.55 | 3.55 |
| | BaO | 46.77 | 45.77 | 44.77 | 42.77 | 39.77 | 34.77 |
| Refractive index | n$_D$ | 1.6021 | 1.6121 | 1.6118 | 1.6111 | 1.6008 | — |
| Thermal expansion coefficient | $\alpha$ ($\times 10^{-7}$/°C.) | 91 | 89 | 86 | 82 | 78 | — |
| Softening temperature | Ts (°C.) | 733 | 733 | 734 | 734 | 734 | — |
| Water resistance (weight loss) | Weight % | 0.401 | 0.529 | 0.641 | 0.723 | 0.745 | — |
| Devitrification | 850° C. | D | D | C | C | D | — |
| | 900° C. | D | D | C | C | D | — |
| | 950° C. | D | D | C | C | D | — |
| Weathering resistance | | a | a | ab | ab | ab | — |

Experimental example 5: Glasses having BaO replaced with MgO, CaO

Glasses having the compositions as shown in Table 5 (Samples 28–33) were prepared similarly as in Experimental example 1 and the characteristics of respective samples were examined.

The methods for evaluation of various characteristics as well as the representation methods are the same as in the foregoing Experimental examples. As seen from Table 5, MgO and CaO improve water resistance without changing thermal expansion coefficient $\alpha$ and softening temperature Ts. As to refractive index, MgO at 3% by weight and CaO at 5% by weight give the maximum value. On the other hand, as to devitrification tendency, MgO has the effect of suppressing devitrification at a level ranging from 2.27 to 4.0% by weight and CaO at a level ranging from 3.55 to 6.67, devitrification being liable to occur at levels higher or lower than said ranges.

Experimental example 6: Glasses having BaO replaced with Na$_2$O, K$_2$O, Li$_2$O Glasses having the compositions as shown in Table 6 (Samples 34–40) were prepared similarly as in Experimental example 1 and the characteristics of respective samples were examined.

The methods for evaluation of various characteristics as well as the representation methods are the same as in the foregoing Experimental examples. As seen from Table 6, Li$_2$O, Na$_2$O and K$_2$O increase thermal expansion coefficient $\alpha$ and lower water resistance. On the other hand, when the contents of Li$_2$O, Na$_2$O and K$_2$O are increased, that is, when the total quantity of these components exceeds 6% by weight, the glass is devitrified. The characteristics of the glass will vary depending on the proportional ratio between Li$_2$O, Na$_2$O and K$_2$O, and it is preferred to have a composition of 2.5% by weight or less of Na$_2$O, with the remainder being constituted of at least one of Li$_2$O and K$_2$O, thereby giving a total content of 1.2 to 6% by weight.

TABLE 5

| Composition (wt. %) | | Sample No. | | | | | |
| --- | --- | --- | --- | --- | --- | --- | --- |
| | | 28 | 29 | 30 | 31 | 32 | 33 |
| | SiO$_2$ | 38.18 | 38.18 | 38.18 | 38.18 | 38.18 | 38.18 |
| | B$_2$O$_3$ | 11.15 | 11.15 | 11.15 | 11.15 | 11.15 | 11.15 |
| | Al$_2$O$_3$ | 4.00 | 4.00 | 4.00 | 4.00 | 4.00 | 4.00 |
| | Na$_2$O | 1.23 | 1.23 | 1.23 | 1.23 | 1.23 | 1.23 |
| | K$_2$O | 1.87 | 1.87 | 1.87 | 1.87 | 1.87 | 1.87 |
| | MgO | — | 1.30 | 2.27 | 3.00 | 4.00 | 5.00 |
| | CaO | — | 2.20 | 3.55 | 5.00 | 6.67 | 8.33 |
| | BaO | 43.57 | 40.07 | 37.75 | 35.57 | 32.90 | 30.24 |
| Refractive index | n$_D$ | 1.5914 | 1.5918 | 1.5940 | 1.5949 | 1.5934 | 1.5930 |
| Thermal expansion coefficient | $\alpha$ ($\times 10^{-7}$/°C.) | 83 | 83 | 84 | 84 | 83 | 84 |
| Softening temperature | Ts (°C.) | 740 | 733 | 746 | 735 | 740 | 740 |
| Water resistance (weight loss) | Weight % | 0.167 | 0.144 | 0.138 | 0.116 | 0.108 | 0.101 |
| Devitrification | 850° C. | D | C | C | C | C | C |
| | 900° C. | D | C | A | A | A | C |
| | 950° C. | D | A | A | A | A | C |
| Weathering resistance | | a | a | a | a | a | a |

TABLE 6

| Composition (wt. %) | | 34 | 35 | 11 | 36 | 37 | 38 | 39 | 40 |
|---|---|---|---|---|---|---|---|---|---|
| | SiO$_2$ | 38.18 | 38.18 | 38.18 | 38.18 | 38.18 | 38.18 | 38.18 | 38.18 |
| | B$_2$O$_3$ | 11.15 | 11.15 | 11.15 | 11.15 | 11.15 | 11.15 | 11.15 | 11.15 |
| | Al$_2$O$_3$ | 4.00 | 4.00 | 4.00 | 4.00 | 4.00 | 4.00 | 4.00 | 4.00 |
| | Na$_2$O | — | 1.23 | 1.23 | 1.50 | 2.10 | 1.23 | 1.50 | 3.10 |
| | K$_2$O | — | — | 1.87 | 2.30 | 3.22 | 1.87 | 2.30 | — |
| | MgO | 2.27 | 2.27 | 2.27 | 2.27 | 2.27 | 2.27 | 2.27 | 2.27 |
| | CaO | 3.55 | 3.55 | 3.55 | 3.55 | 3.55 | 3.55 | 3.55 | 3.55 |
| | BaO | 40.85 | 39.62 | 37.75 | 37.05 | 35.53 | 36.85 | 35.95 | 36.25 |
| | Li$_2$O | — | — | — | — | — | 0.90 | 1.10 | 1.50 |
| Refractive index | n$_D$ | 1.6002 | 1.5970 | 1.5922 | 1.5908 | 1.5825 | 1.5890 | 1.5842 | 1.5869 |
| Thermal expansion coefficient | $\alpha$ ($\times 10^{-7}/°C$) | 77 | 81 | 87 | 89 | 96 | 92 | 97 | 94 |
| Softening temperature | Ts (°C.) | 734 | 734 | 734 | 733 | 733 | 734 | 733 | 734 |
| Water resistance (weight loss) | Weight % | 0.098 | 0.101 | 0.119 | 0.120 | 0.154 | 0.123 | 0.134 | 0.141 |
| Devitrification | 850° C. | C | C | C | C | C | C | C | C |
| | 900° C. | C | C | A | A | C | A | C | C |
| | 950° C. | A | A | A | A | A | A | A | A |
| Weathering resistance | | a | a | a | a | a | a | a | a |

Experimental example 7: Glasses having SiO$_2$ replaced with MgO, CaO

Glasses having the compositions as shown in Table 7 (Samples 41-46) were prepared similarly as in Experimental example 1 and the characteristics of respective samples were examined.

The methods for evaluation of various characteristics as well as the representation methods are the same as in the foregoing Experimental examples. As seen from Table 7, MgO and CaO increase refractive index n$_D$, make greater thermal expansion coefficient $\alpha$, lower softening temperature and also lower water resistance. On the other hand, as to devitrification tendency, the glass becomes more liable to be devitrified as the increase of the total content of CaO and MgO, and devitrification will occur at 850° C. at a level of 3% by weight or higher. The clad layer glass is desired to have a refractive index n$_D$ as small as possible. In this sense, CaO and MgO may preferably not be contained at all, but minute amounts of CaO and MgO have the effect in enhancement of weathering resistance.

TABLE 7

| Composition (wt. %) | | 41 | 42 | 43 | 44 | 45 | 46 |
|---|---|---|---|---|---|---|---|
| | SiO$_2$ | 64.3 | 65.8 | 67.3 | 68.8 | 69.8 | 70.3 |
| | B$_2$O$_3$ | 8.8 | 8.8 | 8.8 | 8.8 | 8.8 | 8.8 |
| | Al$_2$O$_3$ | 6.1 | 6.1 | 6.1 | 6.1 | 6.1 | 6.1 |
| | Li$_2$O | 3.0 | 3.0 | 3.0 | 3.0 | 3.0 | 3.0 |
| | Na$_2$O | 7.0 | 7.0 | 7.0 | 7.0 | 7.0 | 7.0 |
| | K$_2$O | 4.8 | 4.8 | 4.8 | 4.8 | 4.8 | 4.8 |
| | CaO | 4.0 | 3.0 | 2.0 | 1.0 | 0.5 | — |
| | MgO | 2.0 | 1.5 | 1.0 | 0.5 | — | — |
| Refractive index | n$_D$ | 1.5220 | 1.5189 | 1.5660 | 1.5142 | 1.5120 | 1.5111 |
| Thermal expansion coefficient | $\alpha$ ($\times 10^{-7}/°C$) | 88 | 86 | 85 | 84 | 83 | 83 |
| Softening temperature | Ts (°C.) | 632 | 638 | 645 | 651 | 655 | 657 |
| Water resistance (weight loss) | Weight % | 0.064 | 0.058 | 0.052 | 0.045 | 0.039 | 0.033 |
| Devitrification | 850° C. | C | C | C | A | A | A |
| | 900° C. | C | A | A | A | A | A |
| | 950° C. | A | A | A | A | A | A |
| Weathering resistance | | a | a | a | a | a | ab |

Experimental example 8: Glasses having SiO$_2$ replaced with B$_2$O$_3$

Glasses having the compositions as shown in Table 8 (Samples 47-52) were prepared similarly as in Experimental example 1 and the characteristics of respective samples were examined.

The methods for evaluation of various characteristics as well as the representation methods are the same as in the foregoing Experimental examples. As seen from Table 8, B$_2$O$_3$ increases refractive index n$_D$, makes smaller the thermal expansion coefficient $\alpha$, and lowers softening temperature Ts. As to water resistance, the minimum value is at B$_2$O$_3$ content of 10% by weight, and water resistance is lowered at higher or lower contents than said value. On the other hand, as to devitrification, partial devitrification occurs at B$_2$O$_3$ content of 6% by weight, but devitrification does not occur at 7.5% by weight or higher.

TABLE 8

| Composition (wt. %) | | Sample No. | | | | | | |
|---|---|---|---|---|---|---|---|---|
| | | 47 | 48 | 44 | 49 | 50 | 51 | 52 |
| | $SiO_2$ | 71.6 | 70.1 | 68.8 | 67.6 | 65.6 | 63.6 | 59.6 |
| | $B_2O_3$ | 6.0 | 7.5 | 8.8 | 10.0 | 12.0 | 14.0 | 18.0 |
| | $Al_2O_3$ | 6.1 | 6.1 | 6.1 | 6.1 | 6.1 | 6.1 | 6.1 |
| | $Li_2O$ | 3.0 | 3.0 | 3.0 | 3.0 | 3.0 | 3.0 | 3.0 |
| | $Na_2O$ | 7.0 | 7.0 | 7.0 | 7.0 | 7.0 | 7.0 | 7.0 |
| | $K_2O$ | 4.8 | 4.8 | 4.8 | 4.8 | 4.8 | 4.8 | 4.8 |
| | CaO | 1.0 | 1.0 | 1.0 | 1.0 | 1.0 | 1.0 | 1.0 |
| | MgO | 0.5 | 0.5 | 0.5 | 0.5 | 0.5 | 0.5 | 0.5 |
| Refractive index | $n_D$ | 1.5116 | 1.5134 | 1.5142 | 1,5156 | 1.5173 | 1.5186 | 1.5204 |
| Thermal expansion coefficient | $\alpha$ ($\times 10^{-7}/°C.$) | 86 | 85 | 84 | 83 | 82 | 82 | 80 |
| Softening temperature | Ts (°C.) | 658 | 654 | 651 | 648 | 643 | 639 | 633 |
| Water resistance (weight loss) | Weight % | 0.062 | 0.052 | 0.045 | 0.043 | 0.048 | 0.063 | 0.098 |
| Devitrification | 850° C. | C | A | A | A | A | A | A |
| | 900° C. | C | A | A | A | A | A | A |
| | 950° C. | A | A | A | A | A | A | A |
| Weathering resistance | | a | a | a | a | a | a | a |

Experimental example 9: Glasses having $SiO_2$ replaced with $Al_2O_3$

Glasses having the compositions as shown in Table 9 (Samples 53-58) were prepared similarly as in Experimental example 1 and the characteristics of respective samples were examined.

The methods for evaluation of various characteristics as well as the representation methods are the same as in the foregoing Experimental examples. As seen from Table 9, $Al_2O_3$ lowers refractive index $n_D$, makes smaller the thermal expansion coefficient $\alpha$, and lowers softening temperature Ts. As to water resistance, the minimum value is at $Al_2O_3$ content of 7% by weight, and therefore addition of $Al_2O_3$ in excess of 7% by weight will be meaningless even when it is added for improvement of water resistance.

TABLE 9

| Composition (wt. %) | | Sample No. | | | | | |
|---|---|---|---|---|---|---|---|
| | | 53 | 54 | 55 | 56 | 57 | 58 |
| | $SiO_2$ | 72.9 | 71.9 | 70.9 | 69.9 | 68.9 | 67.9 |
| | $B_2O_3$ | 8.8 | 8.8 | 8.8 | 8.8 | 8.8 | 8.8 |
| | $Al_2O_3$ | 3.0 | 4.0 | 5.0 | 6.0 | 7.0 | 8.0 |
| | $Li_2O$ | 3.0 | 3.0 | 3.0 | 3.0 | 3.0 | 3.0 |
| | $Na_2O$ | 7.0 | 7.0 | 7.0 | 7.0 | 7.0 | 7.0 |
| | $K_2O$ | 4.8 | 4.8 | 4.8 | 4.8 | 4.8 | 4.8 |
| | CaO | 0.5 | 0.5 | 0.5 | 0.5 | 0.5 | 0.5 |
| | MgO | — | — | — | — | — | — |
| Refractive index | $n_D$ | 1.5127 | 1.5125 | 1.5123 | 1.5120 | 1.5118 | 1.5114 |
| Thermal expansion coefficient | $\alpha$ ($\times 10^{-7}/°C.$) | 85 | 84 | 83 | 83 | 83 | 82 |
| Softening temperature | Ts (°C.) | 661 | 659 | 657 | 655 | 654 | 654 |
| Water resistance (weight loss) | Weight % | 0.062 | 0.053 | 0.046 | 0.039 | 0.032 | 0.039 |
| Devitrification | 850° C. | A | A | A | A | A | A |
| | 900° C. | A | A | A | A | A | A |
| | 950° C. | A | A | A | A | A | A |
| Weathering resistance | | a | a | a | a | a | a |

Experimental example 10: Influences of $Na_2O$, $K_2O$, $Li_2O$, ZnO, $ZrO_2$

Glasses having the compositions as shown in Table 10 (Samples 59-65) were prepared similarly as in Experimental example 1 and the characteristics of respective samples were examined.

The methods for evaluation of various characteristics as well as the representation methods are the same as in the foregoing Experimental examples. As seen from Table 10, $Li_2O$, $Na_2O$ and $K_2O$ increase refractive index $n_D$, make greater the thermal expansion coefficient $\alpha$, lower water resistance and strengthen the tendency for devitrification. On the other hand, $Li_2O$, $Na_2O$ and $K_2O$ have the effects of making the glass readily soluble and lowering the melting temperature, and they can be essential components for lowering the melting temperature in order to minimize the possibility of environmental pollution at the time of melting. ZnO and $ZrO_2$, while they can improve water resistance, increase refractive index $n_D$, and therefore it is preferred to use up to 3% by weight of these components in the glass component for the clad layer.

TABLE 10

| Composition (wt. %) | | 59 | 60 | 61 | 62 | 63 | 64 | 65 |
|---|---|---|---|---|---|---|---|---|
| | $SiO_2$ | 68.7 | 67.7 | 68.9 | 67.9 | 66.9 | 67.9 | 67.9 |
| | $B_2O_3$ | 8.8 | 8.8 | 8.8 | 8.8 | 8.8 | 8.8 | 8.8 |
| | $Al_2O_3$ | 5.5 | 5.5 | 5.5 | 5.5 | 5.5 | 5.5 | 5.5 |
| | $Li_2O$ | 4.0 | 4.0 | 4.0 | 4.0 | 4.0 | 4.0 | 4.0 |
| | $Na_2O$ | 8.0 | 8.0 | 7.0 | 7.0 | 7.0 | 7.0 | 7.0 |
| | $K_2O$ | 5.0 | 6.0 | 4.8 | 4.8 | 4.8 | 4.8 | 4.8 |
| | CaO | — | — | — | — | — | — | — |
| | MgO | — | — | — | — | — | — | — |
| | ZnO | — | — | 1.0 | 2.0 | 3.0 | 1.0 | — |
| | $ZrO_2$ | — | — | — | — | — | 1.0 | 2.0 |
| Refractive index | $n_D$ | 1.5143 | 1.5152 | 1.5142 | 1.5159 | 1.5172 | 1.5161 | 1.5157 |
| Thermal expansion coefficient | $\alpha$ ($\times 10^{-7}/°C.$) | 87 | 88 | 85 | 85 | 86 | 85 | 84 |
| Softening temperature | Ts (°C.) | 646 | 652 | 652 | 648 | 647 | 649 | 651 |
| Water resistance (weight loss) | Weight % | 0.072 | 0.088 | 0.039 | 0.031 | 0.030 | 0.032 | 0.030 |
| Devitrification | 850° C. | A | A | A | A | A | A | A |
| | 900° C. | A | A | A | A | A | A | A |
| | 950° C. | A | A | A | A | A | A | A |
| Weathering resistance | | a | a | a | a | a | a | a |

Among the glasses having the compositions obtained in the above Experimental examples 1 to 10, those of Experimental examples of 1 to 6 (Samples 1-40) are applicable as glasses for the core, while those of Experimental examples 7 to 10 (Samples 41-65) are applicable as glasses for the clad layer.

B. Preparation of glass fibers and their characteristics

Example 1

Figure 3:
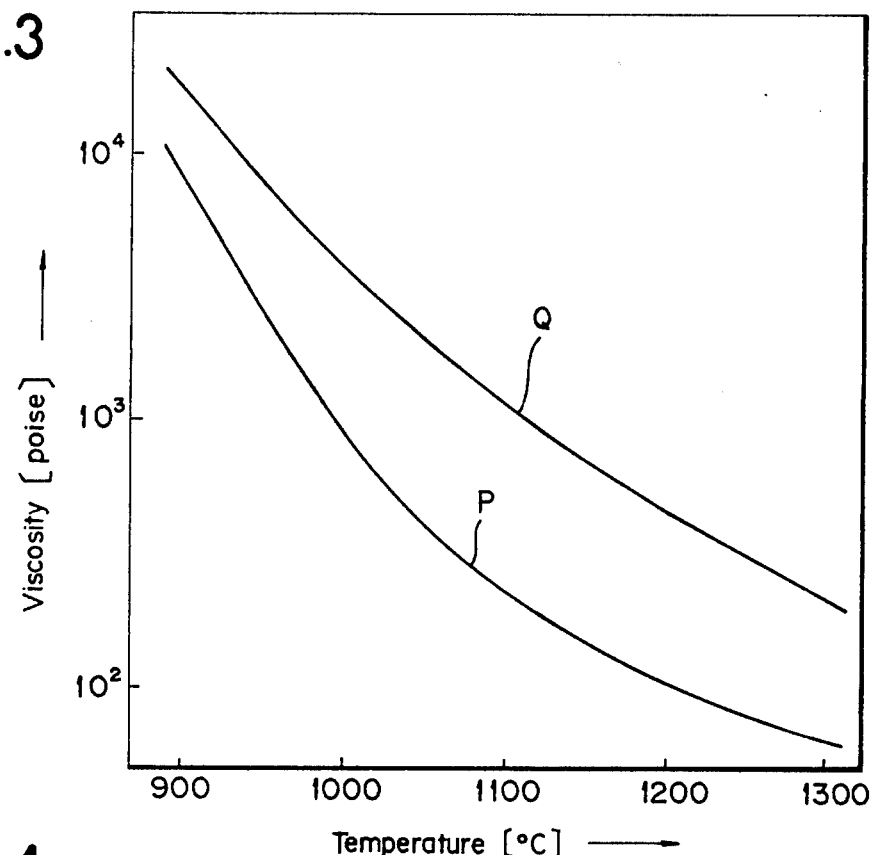
FIG. 3 is a graph showing the relationship between the fiber drawing temperatures and the viscosities of the glasses for the core and the clad layer in preparation of the fiber according to the present invention in Example 1.

A fiber was prepared by using the Sample glass 5 in Experimental example 1 for the core and the Sample glass 46 in Experimental example 7 for the clad layer. In preparation of both glasses, there were employed starting materials of super high purity containing Fe, Cu and Mn in amounts of less than 10 ppb, respectively, and they were melted using a high purity platinum crucible and a crucible made of quartz in an electric furnace in a clean room. As the starting materials, there were empolyed primarily $SiO_2$, $Na_2CO_3$, $Na_2B_4O.10H_2O$, $CaCO_3$, $BaCO_3$, etc. A part of the $Na_2O$ component was replaced with NaF, which was effective for improvement of refining. The glasses molded after melting were charged into a double crucible made of a high purity platinum in which the core glass was separated from the clad layer glass, and having a concentric orifice, and the fiber falling from the orifice was subjected to fiber drawing. The fiber drawing temperature was within the range of from 900° to 950° C. The viscosities of respective glasses 5 and 46 for core and clad layer versus fiber drawing temperatures are shown in FIG. 3. As shown in FIG. 3 the glass for the core (indicated by the curve P in the drawing) is lower in viscosity than the glass 46 for the clad layer (indicated by the curve Q in the drawing), but its difference was small and therefore the fiber drawing operation could be carried out stably. The fiber falling down was controlled to a dimension of 140±1 μm by the control system including an outer diameter measuring instrument. The fiber was coated with a resin before it was wound up around a wind-up drum coated with a resin before it was wound up around a wind-up drum to prevent lowering of its strength caused by scratches and others on the surface.

The thus prepared fiber had a numerical aperture of 0.51 and the optical losses at 840 nm and 1100 nm were 14.2 dB/Km and 10.8 dB/Km, respectively.

Example 2

There was prepared a fiber, using the Sample glass 11 in the Experimental example 2 for the core and the Sample glass 55 in the Experimental example 9 for the clad layer. The starting materials and the method for fabrication of the fiber were the same as in Example 1. The fiber obtained by this combination had a numerical aperture of 0.50 and the optical losses at 840 nm and 1100 nm were 13.8 dB/Km and 10.7 dB/Km, respectively.

Example 3

There was prepared a fiber, using the Sample glass 18 in the Experimental example 3 for the core and the Sample glass 49 in the Experimental example 8 for the clad layer. The starting materials and the method for fabrication of the fiber were the same as in Example 1. The fiber obtained by this combination had a numerical aperture of 0.49 and the optical losses at 840 nm and 1100 nm were each 14.1 dB/Km.

Example 4

There was prepared a fiber, using a combination of the Sample glass 30 in the Experimental example 5 for the core with the Sample glass 62 in the Experimental example 10 for the clad layer. The starting materials and the method for fabrication of the fiber were the same as in Example 1.

The thus prepared fiber had a numerical aperture of 0.49 and the optical losses at 840 nm and 1100 nm were 12.2 dB/Km and 10.7 dB/Km, respectively.

Example 5

Figure 4:
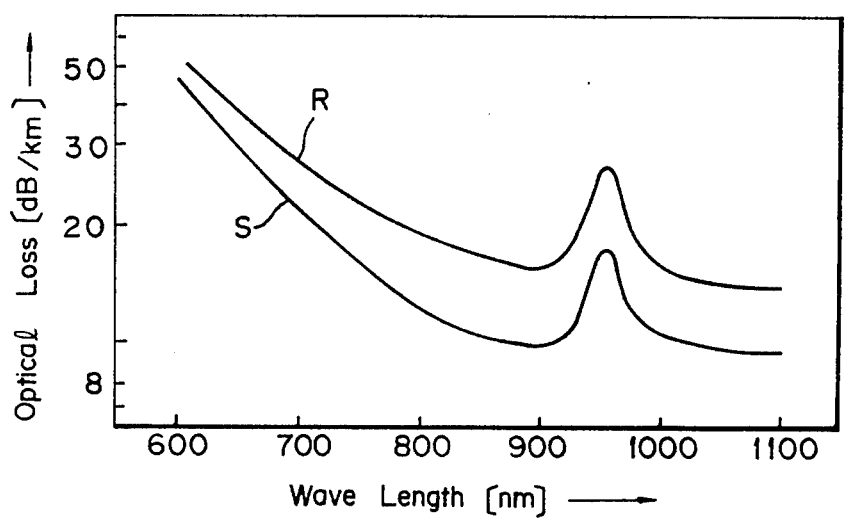
FIG. 4 is a spectrum curve of the optical loss of the fiber according to the present invention in Example 5.

There was prepared a fiber, using the Sample glass 4 in the Experimental example 1 for the core and the Sample glass 46 in the Experimental example 7 for the clad layer. Two kinds of the Sample glasses 4 were herein employed, one being applied with a refining agent of $Sb_2O_3$ and the other being applied with a refining agent of $As_2O_3$ before melting. The starting materials and the method for fabrication of the fiber were the same as in Example 1. The fiber obtained by this combination had a numerical aperture of 0.52. The optical loss spectrum of this fiber was measured to give the result as shown in FIG. 4. As seen from FIG. 4, in case of the glass using a refining agent of $As_2O_3$, the optical loss at the wavelength of 840 nm was 16.5 dB/Km and that at the wavelength of 1100 nm was 13.8 dB/Km, as shown in the curve R in the graph. In the case of the glass using a refining agent of $Sb_2O_3$, the optical loss at the wavelength of 840 nm was 10.8 dB/Km and that at the wavelength of 1100 nm was 9.2 dB/Km, as shown in the curve S in the graph.

Example 6 Evaluation of weathering resistance

The six kinds of the fiber prepared in Examples 1 to 5 were immersed in hot water at 60° C. and in water at normal temperature for one year, and the changes in strength were measured. All of the fibers were deteriorated in strength by 25 to 15% of the initial strength in hot water at 60° C., while by 5 to 20% in water at normal temperature, thus exhibiting improvement in reliability dramatically over the multi-component system glass fibers of the prior art.

As mentioned in the foregoing Example 5, use of a refining agent of $Sb_2O_3$ was found to be more effective for reduction of the loss than use of $As_2O_3$. While it was possible to melt the glass either in a crucible made of platinum or in a crucible made of quartz, in order to suppress the loss by light scattering originating from platinum ion or particles caused by dissolution of the platinum crucible, and light scattering originating from generation of striae caused by melting of the quartz crucible itself at its minimum, it was found to be advantageous to carry out the melting in a crucible made of quartz in the steps from charge of the starting material prior to refining and in a crucible made of platinum in the steps of refining et seq. It is important that handling of starting materials such as the formulation, should be carried out in a clean room and weighing instruments therefor should be made of quartz or Teflon, whereby contamination by impurities from the environment can be prevented.

The multi-component system glass fiber has a loss through scattering in the range of from 4.5 to 5.0 dB/Km, the optical loss through other causes than scattering being several dB/Km. This is an absorption loss caused by transition metal oxides such as of Fe or Cu or OH groups existing in the glass. Such an absorption loss can be reduced with the development of the starting material purification technique and glass melting technique, and thus there can be ultimately expected a fiber with a loss of around 5 dB/Km.

The present invention is not limited by the Examples as described above, but various modifications can be practiced without departure from the spirit of the invention.

We claim:

1. A multi-component system glass fiber for optical communication which comprises:
   a core of a multi-component system glass having a composition consisting essentially of 35 to 45% by weight of $SiO_2$, 35 to 45% by weight of BaO, 3 to 7% by weight of $Al_2O_3$, 9 to 13% by weight of $B_2O_3$, 1.2 to 4% by weight of at least one alkali metal oxide selected from the group consisting of $Na_2O$, $K_2O$ and $Li_2O$, the content of $Na_2O$ being 2.5% by weight or less, and 4 to 11% by weight of at least one alkaline earth metal oxide selected from the group consisting of MgO and CaO; and
   a clad layer, on said core, of a multi-component system glass having a composition consisting essentially of 66 to 71% by weight of $SiO_2$, 4 to 7% by weight of $Al_2O_3$, 7 to 12% by weight of $B_2O_3$, 12 to 16% by weight of at least one alkali metal oxide selected from the group consisting of $Na_2O$, $K_2O$ and $Li_2O$, 2% by weight or less of at least one alkaline earth metal oxide selected from the group consisting of MgO and CaO, and 3% by weight or less of at least one of ZnO, $ZrO_2$ and $TiO_2$.

2. A multi-component system glass fiber for optical communication according to claim 1, which comprises:
   a core of a multi-component system glass having a composition consisting essentially of 36 to 41% by weight of $SiO_2$, 36 to 41% by weight of BaO, 3.5 to 5% by weight of $Al_2O_3$, 10 12% by weight of $B_2O_3$, 1.2% to 4% by weight of at least one alkali metal oxide selected from the group consisting of $Na_2O$, $K_2O$ and $Li_2O$, the content of $Na_2O$ being 1.5% by weight or less, and 4.5 to 7% by weight of at least one alkaline earth metal oxide selected from the group consisting of MgO and CaO; and
   a clad layer, on said core, of a multi-component system glass having a composition consisting essentially of 67 to 70% by weight of $SiO_2$, 5.5 to 7% by weight of $Al_2O_3$, 7.5 to 10% by weight of $B_2O_3$, 13.5 to 16% by weight of at least one alkali metal oxide selected from the group consisting of $Na_2O$, $K_2O$ and $Li_2O$, 1% by weight or less of at least one alkaline earth metal oxide selected from the group consisting of MgO and CaO, and 2.5% by weight or less of at least one of ZnO, $ZrO_2$ and $TiO_2$.

3. A multi-component system glass fiber for optical communication according to claim 1 wherein the amount of MgO in the core is 2 to 4% by weight.

4. A multi-component system glass fiber for optical communication according to claim 1 wherein the amount of CaO in the core is 3 to 7% by weight.

5. A multi-component system glass fiber for optical communication according to claim 1 wherein the amounts of $Na_2O$, $K_2O$ and $Li_2O$ in the clad layer are 6 to 8%, 3.5 to 6% and 2 to 4% by weight, respectively.

6. A multi-component system glass fiber for optical communication according to claim 1, wherein the amount of $Na_2O$ in the core is at least about 1.2% by weight.

* * * * *